(12) United States Patent
Ueda

(10) Patent No.: US 10,173,477 B2
(45) Date of Patent: Jan. 8, 2019

(54) PNEUMATIC TIRE

(71) Applicant: SUMITOMO RUBBER INDUSTRIES, LTD., Kobe-shi, Hyogo (JP)

(72) Inventor: Kenji Ueda, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 402 days.

(21) Appl. No.: 14/436,006

(22) PCT Filed: Oct. 29, 2013

(86) PCT No.: PCT/JP2013/079244
§ 371 (c)(1),
(2) Date: Apr. 15, 2015

(87) PCT Pub. No.: WO2014/073418
PCT Pub. Date: May 15, 2014

(65) Prior Publication Data
US 2015/0283865 A1 Oct. 8, 2015

(30) Foreign Application Priority Data
Nov. 12, 2012 (JP) ................. 2012-247995

(51) Int. Cl.
*B60C 15/04* (2006.01)
*B60C 15/06* (2006.01)
*B60C 5/00* (2006.01)
(Continued)

(52) U.S. Cl.
CPC ............. *B60C 15/04* (2013.01); *B60C 5/00* (2013.01); *B60C 15/02* (2013.01); *B60C 15/06* (2013.01);
(Continued)

(58) Field of Classification Search
CPC .......... B60C 15/04; B60C 5/00; B60C 15/02; B60C 15/06; B60C 2001/005;
(Continued)

(56) References Cited

U.S. PATENT DOCUMENTS 3,460,599 A * 8/1969 Leach .................. B60C 15/06
 152/458
4,405,007 A * 9/1983 Welter .................. B60C 3/00
 152/454
(Continued)

FOREIGN PATENT DOCUMENTS

JP 2-179515 A 7/1990
JP 02179515 A * 7/1990
(Continued)

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A tire includes a pair of beads, a carcass, chafers, an insulation, and cushion layers. Each bead includes a core positioned inward of the bead in a radial direction. At an inside of the core in the radial direction, the insulation is laminated on the chafers so as to be located outward of the chafers in the radial direction. Each cushion layer is laminated on the insulation so as to be located outward of the insulation in the radial direction. The insulation and the cushion layer are formed from respective crosslinked rubbers different from each other. A compressive elastic modulus $E\alpha^*$ of the crosslinked rubber of the cushion layer is smaller than a compressive elastic modulus $E\beta^*$ of the crosslinked rubber of the insulation.

19 Claims, 4 Drawing Sheets

(51) Int. Cl.
 B60C 15/02 (2006.01)
 B60C 1/00 (2006.01)
(52) U.S. Cl.
 CPC *B60C 2001/005* (2013.01); *B60C 2015/0614* (2013.01); *B60C 2015/0617* (2013.01); *Y10T 152/10828* (2015.01)
(58) Field of Classification Search
 CPC ..... B60C 2015/0614; B60C 2015/0617; Y10T 152/10828
 See application file for complete search history.

(56) References Cited

U.S. PATENT DOCUMENTS

| | | | | |
|---|---|---|---|---|
| 5,499,670 | A | * | 3/1996 | Billieres ............ B60C 5/16 152/510 |
| 2005/0211362 | A1 | * | 9/2005 | Hirayama ............ B60C 15/06 152/547 |
| 2008/0035261 | A1 | * | 2/2008 | Maruoka ........... B60C 15/0027 152/454 |
| 2008/0093001 | A1 | * | 4/2008 | Ono ..................... B60C 5/14 152/510 |
| 2009/0266458 | A1 | * | 10/2009 | Takahashi ......... B60C 11/0302 152/209.18 |
| 2010/0230026 | A1 | | 9/2010 | Yamazaki |

FOREIGN PATENT DOCUMENTS

| | | |
|---|---|---|
| JP | 4-254206 A | 9/1992 |
| JP | 2010-215020 A | 9/2010 |
| JP | 2010-247794 A | 11/2010 |
| JP | 2010-284917 A | 12/2010 |
| JP | 2012-40780 A | 3/2012 |

\* cited by examiner

PNEUMATIC TIRE

TECHNICAL FIELD

The present invention relates to the structures of pneumatic tires.

BACKGROUND ART

A pneumatic tire is mounted to a rim when used. In a tire, bead cores and portions positioned inward, in a radial direction, of the bead cores mainly generate a fastening force. Thus, the tire is integrated with a rim. A tire is inflated with air in a state where the tire is integrated with the rim to use the tire.

CITATION LIST

Patent Literature

Patent Literature 1: JP2010-215020

SUMMARY OF THE INVENTION

Problems to Be Solved By the Invention

When a diameter of bead cores of a tire with respect to a diameter of a rim is small, a fastening force of the beads which acts on the rim becomes great. If the fastening force is excessively great, it is difficult to mount the tire to the rim. In other words, this tire has poor rim mountability. On the other hand, when the diameter of the cores of a tire with respect to the diameter of a rim is large, a fastening force of the beads which acts on the rim becomes insufficient. When the fastening force is insufficient, the tire is likely to be detached from the rim. If variation in the difference between the diameter of the rim and the diameter of the bead cores is great, variation in the fastening force also becomes great. However, it is not easy to appropriately control the difference between the diameter of the rim and the diameter of the bead cores.

An object of the present invention is to provide a pneumatic tire which has small variation in fastening force and excellent rim mountability.

Solution to the Problems

A pneumatic tire according to the present invention includes a pair of beads, a carcass extending along and inward of a tread and sidewalls and on and between one of the beads and the other bead, chafers positioned near the beads and abutted on a rim, an insulation, and cushion layers. Each bead includes a core positioned inward of the bead in a radial direction. At an inside of the core in the radial direction, the insulation is laminated on each chafer so as to be located outward of the chafer in the radial direction. Each cushion layer is laminated on the insulation so as to be located outward of the insulation in the radial direction. The insulation and the cushion layer are formed from respective crosslinked rubbers different from each other. A compressive elastic modulus $E\alpha^*$ of the crosslinked rubber of the cushion layer is smaller than a compressive elastic modulus $E\beta^*$ of the crosslinked rubber of the insulation.

Preferably, a thickness $L$, in the radial direction, from the chafer to the core is equal to or greater than 4 mm and equal to or less than 8 mm.

Preferably, at an inside of the core in the radial direction, a ratio ($L\alpha/L$) of a thickness $L\alpha$ of the cushion layer to the thickness $L$ is equal to or greater than 0.5.

Preferably, a ratio ($E\alpha^*/E\beta^*$) of the compressive elastic modulus $E\alpha^*$ of the crosslinked rubber of the cushion layer to the compressive elastic modulus $E\beta^*$ of the crosslinked rubber of the insulation is equal to or greater than 0.5.

Preferably, in the tire, when a fastening force in a state where the tire is mounted to a rim ranges from 3 (kN) to 4 (kN), a gradient of change of the fastening force with respect to change of an amount of compressive deformation is equal to or greater than 1.5 (kN/mm) and equal to or less than 2 (kN/mm).

Preferably, in the tire, the core is formed by winding a bead wire in a circumferential direction. The bead wire is wound so as to be stacked in both the radial direction and an axial direction.

Preferably, a compression set of the crosslinked rubber of the cushion layer is equal to or less than 30%.

Advantageous Effects of the Invention

In a tire according to the present invention, fluctuation in fastening force due to variation of the diameter of a rim and/or the diameter of the core of a tire is reduced. Since the fluctuation of the fastening force is reduced, the fastening force acting on a rim is stable. The tire has excellent rim mountability.

BRIEF DESCRIPTION OF THE DRAWINGS

FIG. 1 is a cross-sectional view showing a portion of a pneumatic tire according to one embodiment of the present invention.

FIG. 2 is an illustration showing a cross section of a core in FIG. 1.

FIG. 3 is an illustration showing a use condition of the tire in FIG. 1.

FIG. 4 is a graph showing relationship between an amount of compressive deformation and a fastening force in tires.

DESCRIPTION OF EMBODIMENTS

The following will describe in detail the present invention based on preferred embodiments with appropriate reference to the drawings.

Figure 1:
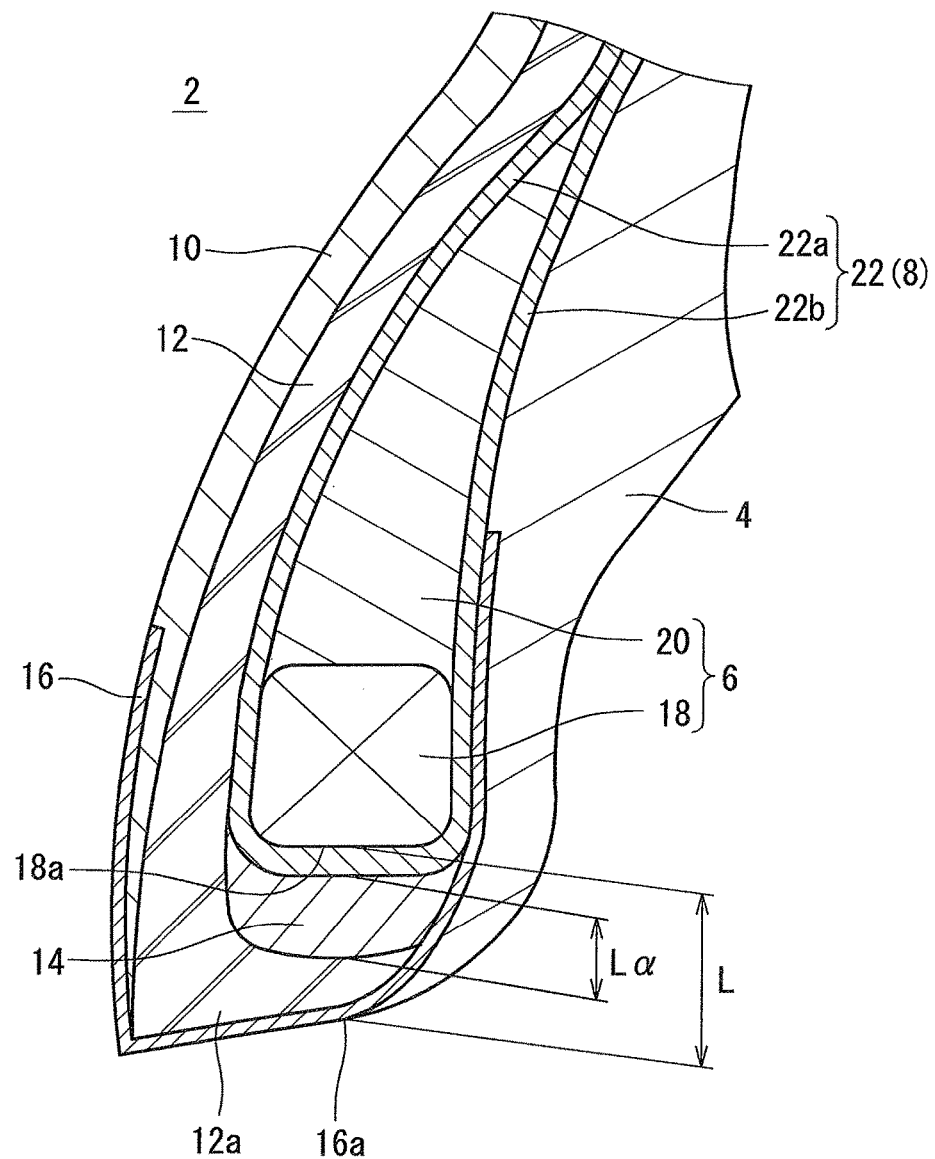
[FIG. 1]

FIG. 1 shows a portion of a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. Although not shown in the drawings, the shape of the tire 2 is symmetrical about the equator plane of the tire except for a tread pattern.

The tire 2 includes clinches 4, beads 6, a carcass 8, an inner liner 10, an insulation 12, cushion layers 14, and chafers 16. Although not shown in the drawings, the tire 2 further includes a tread, sidewalls, a belt, and a band. The tire 2 is of a tubeless type. The tire 2 is mounted to, for example, passenger cars.

Although not shown in the drawing, the tread has a shape that projects outward in the radial direction. The tread forms a tread surface that is brought into contact with a road surface. Grooves are formed on the tread surface. The grooves form a tread pattern. The tread includes a base layer and a cap layer laminated on the base layer so as to be located outward of the base layer in the radial direction. The base layer is formed of a crosslinked rubber which is excellent in adhesiveness. A typical base rubber of the base layer is a natural rubber. The cap layer is formed of a crosslinked rubber which is excellent in wear resistance, heat resistance and grip performance.

Each sidewall extends almost inward in the radial direction from corresponding end of the tread. The outside end, in the radial direction, of the sidewall is joined to the tread. The inside end, in the radial direction, of the sidewall is joined to one of the clinches 4. The sidewall is formed of a crosslinked rubber which is excellent in cut resistance and weather resistance. The sidewall prevents damage of the carcass 8.

Each clinch 4 is located almost inward of the sidewall in the radial direction. The clinch 4 is located outward of corresponding one of the beads 6 and the carcass 8 in the axial direction. The clinch 4 is formed of a crosslinked rubber which is excellent in wear resistance. The clinch 4 abuts on a flange of a rim.

Each bead 6 is located inward of the clinch 4 in the axial direction. The bead 6 includes a core 18 and an apex 20 that extends outward from the core 18 in the radial direction. The apex 20 is tapered outward in the radial direction. The apex 20 is formed of a highly hard crosslinked rubber. The core 18 is formed so as to be ring-shaped in the circumferential direction.

The carcass 8 is formed of a carcass ply 22. The carcass ply 22 extends along the tread and the sidewalls and on and between the beads 6 on both sides. The carcass ply 22 is turned up around the core 18 from the inner side toward the outer side in the axial direction. Due to this turning-up, the carcass ply 22 includes a main portion 22a and turned-up portions 22b. Due to this turning-up, the carcass ply 22 is laminated on the core 18 so as to be located inward of the core 18 in the radial direction. The carcass 8 may include two or more carcass plies.

The carcass ply 22 includes multiple cords aligned with each other and a topping rubber, although not shown in the drawings. An absolute value of an angle of each cord relative to the equator plane ranges from 75° to 90°. In other words, the carcass 8 forms a radial structure. The cords are formed of an organic fiber. Examples of preferable organic fiber include a polyester fiber, a nylon fiber, a rayon fiber, a polyethylene naphthalate fiber, and an aramid fiber.

The belt is located inward of the tread in the radial direction. The belt is laminated on the carcass 8. The belt reinforces the carcass 8. The belt includes an inner layer and an outer layer, for example. Each of the inner layer and the outer layer includes multiple cords aligned with each other and a topping rubber. Each cord is tilted relative to the equator plane. An absolute value of the tilt angle is typically equal to or greater than 10° and equal to or less than 35°. A direction in which each cord of the inner layer is tilted relative to the equator plane is opposite to a direction in which each cord of the outer layer is tilted relative to the equator plane. A preferable material of the cords is a steel. An organic fiber may be used for the cords.

The band is located outward of the belt in the radial direction. The band includes a cord and a topping rubber. The cord is helically wound. The band has a so-called jointless structure. The cord extends substantially in the circumferential direction. The angle of the cord relative to the circumferential direction is equal to or less than 5°, and more preferably equal to or less than 2°. The belt is held by the cord, to reduce lifting of the belt. The cord is formed of an organic fiber. Examples of preferable organic fiber include a nylon fiber, a polyester fiber, a rayon fiber, a polyethylene naphthalate fiber, and an aramid fiber.

The belt and the band form a reinforcing layer. The reinforcing layer may be formed by only the belt. The reinforcing layer may be formed by only the band.

The inner liner 10 is located inward of the carcass 8. Although not shown in the drawings, the inner liner 10 is joined to an inner circumferential surface of the carcass 8 near the equator plane. The inner liner 10 is formed of a crosslinked rubber. A rubber which has an excellent air sealing property is used for the inner liner 10. A typical base rubber of the inner liner 10 is a butyl rubber or halogenated butyl rubber. The inner liner 10 maintains the internal pressure of the tire 2.

The insulation 12 is located inward of the sidewall in the axial direction. The insulation 12 is interposed between the carcass 8 and the inner liner 10 in the axial direction. A lower part 12a of the insulation 12 extends from the inner side toward the outer side in the axial direction. The lower part 12a is interposed between the cushion layer 14 and the chafer 16 in the radial direction. The insulation 12 is formed of a crosslinked rubber which is excellent in adhesiveness. The insulation 12 is firmly joined to the carcass 8 and firmly joined also to the inner liner 10 in the axial direction. Due to the insulation 12, separation of the inner liner 10 from the carcass 8 at an inside of the sidewall in the axial direction is less likely to occur. The lower part 12a of the insulation 12 is firmly joined to the chafer 16 and to the cushion layer 14.

Each cushion layer 14 is located inward of the core 18 in the radial direction. The cushion layer 14 is located between the carcass ply 22 and the lower part 12a of the insulation 12. The cushion layer 14 is interposed between the carcass ply 22 and the lower part 12a in the radial direction.

The cushion layer 14 is formed of a crosslinked rubber softer than that of the insulation 12. When a modulus M100 of the crosslinked rubber of the insulation 12 is, for example, equal to or greater than 4.0 MPa and equal to or less than 6.0 MPa, a modulus M100 of the crosslinked rubber of the cushion layer 14 is preferably equal to or greater than 3.0 MPa and equal to or less than 4.0 MPa. When the modulus M100 of the crosslinked rubber of the insulation 12 is, for example, equal to or greater than 3.0 MPa and equal to or less than 4.0 MPa, the modulus M100 of the crosslinked rubber of the cushion layer 14 is preferably equal to or greater than 2.0 MPa and equal to or less than 3.0 MPa. When the modulus M100 of the crosslinked rubber of the insulation 12 is, for example, equal to or greater than 2.0 MPa and equal to or less than 3.0 MPa, the modulus M100 of the crosslinked rubber of the cushion layer 14 is preferably equal to or greater than 1.0 MPa and equal to or less than 2.0 MPa.

Each chafer 16 is located near the bead 6. When the tire 2 is mounted to a rim, the chafer 16 abuts on the rim. Due to this abutting, a portion near the bead 6 is protected. In the present embodiment, the chafer 16 is formed of a fabric and a rubber impregnated into the fabric. The chafer 16 may be integrally formed with the clinch 4. A material of the chafer 16 may be the same as a material of the clinch 4.

A double-headed arrow L in FIG. 1 represents a thickness, in the radial direction, from the core 18 to the chafer 16. The thickness L is a distance between a bottom surface 18a of the core 18 and a bottom surface 16a of the chafer 16. A double-headed arrow $L\alpha$ represents a thickness, in the radial direction, of the cushion layer 14. The thickness L and the thickness $L\alpha$ is measured in the radial direction on the cross section of FIG. 1. The thickness L and the thickness $L\alpha$ is measured at a center position, in the axial direction, of the bottom surface 18a of the core 18.

Figure 2:
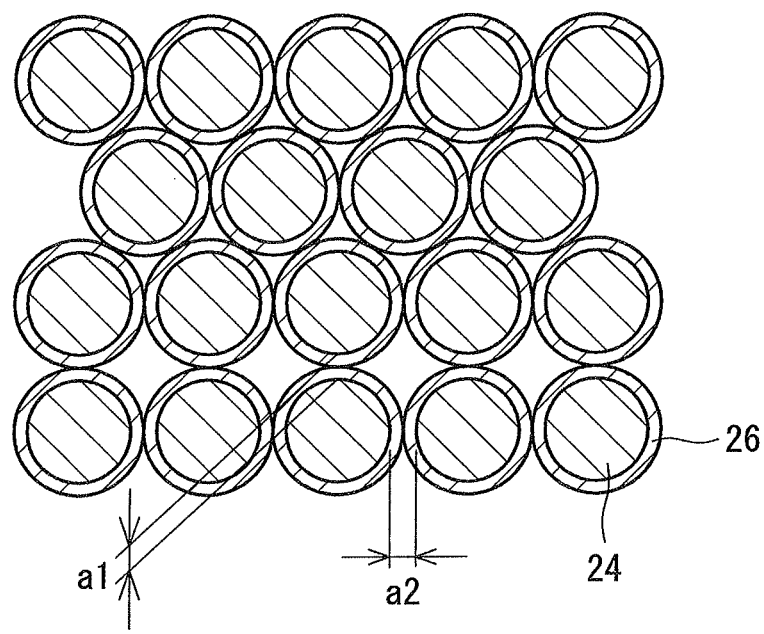
[FIG. 2]

FIG. 2 is an enlarged view of a cross section of the core 18 in FIG. 1. The core 18 includes a non-stretchable wire 24 and a coating rubber 26 coating the outer surface of the wire 24. The wire 24 is wound in the circumferential direction. Although one wire 24 is wound in the circumferential direction in the core 18, two or more wires may be wound in the circumferential direction. A typical material of the wire 24 is a steel. In FIG. 2, the up-down direction is the radial direction of the tire 2, and the right-left direction is the axial direction. In the core 18, the wire 24 is wound so as to be stacked in both the radial direction and the axial direction.

A double-headed arrow a1 in FIG. 2 represents an interval between the stacked wire 24 in the radial direction. The interval a1 is measured as a distance, in the radial direction, between outer surfaces of the wire 24. The interval a1 is measured between an innermost cross section of the wire 24 in the radial direction and an outward cross section of the wire 24 of the innermost cross section in the radial direction. The interval a1 is calculated as an average value of intervals obtained from a plurality of the cross sections aligned with each other in the axial direction on the wire 24. A double-headed arrow a2 is an interval of the stacked wire 24 in the axial direction. The interval a2 is measured as a distance between outer surfaces of the wire 24. The interval a2 is calculated as an average value of intervals of the cross sections aligned with each other in the axial direction on the wire 24. The interval a1 and the interval a2 are filled with the coating rubber 26.

Figure 3:
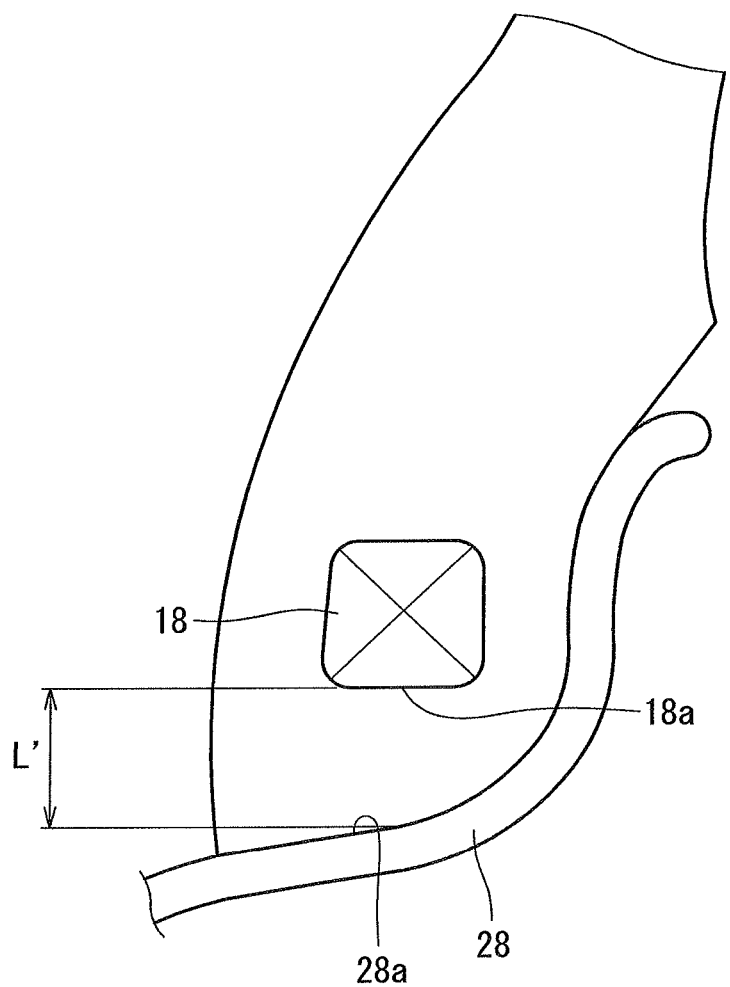
[FIG. 3]

FIG. 3 shows a state in which the tire 2 is mounted to a rim 28. A double-headed arrow L' represents a distance between the bottom surface 18a of the core 18 and a surface 28a of the rim 28. The bottom surface 18a of the core 18 is a surface opposing the surface 28a of the rim 28 in the mounted state. When the tire 2 is mounted to the rim 28, a region inward of the core 18 in the radial direction is mainly compressively deformed. A difference between the thickness L and the distance L' is an amount δ of compressive deformation. The compressive deformation generates a fastening force in the bead 6.

Generally, in tires for passenger cars, a fastening force F in a state where the tire is mounted to a rim ranges approximately from 2 (kN) to 5 (kN). Even when the amount δ of compressive deformation is changed, a predetermined fastening force F is likely to be obtained because, when the fastening force F ranges from 3 (kN) to 4 (kN), a gradient of the change of fastening force with respect to the change of the amount δ of compressive deformation is made small. Thus, rim mountability can be particularly improved. In this respect, the gradient of the change of the fastening force with respect to the change of the amount δ of compressive deformation in a condition, in which the fastening force F ranges from 3 (kN) to 4 (kN), is preferably equal to or less than 2 (kN/mm). On the other hand, if the gradient is too small, the amount δ of compressive deformation for obtaining a sufficient fastening force F becomes excessive. In this respect, the gradient is equal to or greater than 1.5 (kN/mm).

In a compressive deformation, separation of members from the cushion layer 14 to the chafer 16 is less likely to occur by positioning the insulation 12 between the cushion layer 14 and the chafer 16. In the tire 2, the change of the fastening force due to a difference between the diameter of the rim and the diameter of the core 18 is reduced. The tire 2 is also excellent in durability.

Furthermore, in the tire 2, the cushion layer 14 is disposed inward of the core 18 in the radial direction, and thereby the thickness L becomes large. In the tire 2 having a large thickness L, the fastening force in a state where the tire is mounted to a rim is restrained from being increased. In this respect, the thickness L is preferably equal to or greater than 4.0 mm. On the other hand, in the tire 2 having a large thickness L, a sufficient fastening force is difficult to be obtained. In this respect, the thickness L is preferably equal to or less than 8 mm.

Furthermore, in the tire 2 having a large ratio (Lα/L) of the thickness Lα of the cushion layer 14 to the thickness L, the change of the fastening force due to compressive deformation is reduced. In this respect, the ratio (Lα/L) is preferably equal to or greater than 0.5, more preferably equal to or greater than 0.6, and particularly preferably equal to or greater than 0.7. On the other hand, when the thickness Lα of the cushion layer 14 is increased, the amount δ of compressive deformation for obtaining a predetermined fastening force becomes large. When the tire 2 is mounted to a rim, a sufficient fastening force is difficult to be obtained. In this respect, the ratio (Lα/L) is preferably equal to or less than 0.8.

As shown in FIG. 2, in the tire 2, the wire 24 is wound so as to be stacked in both the radial direction and the axial direction. Deformation is reduced in the core 18 in which the wire 24 is stacked in both the radial direction and the axial direction. In the tire 2 in which the deformation of the core 18 is reduced, an effect of reducing the fastening force is particularly likely to be obtained by providing the cushion layer 14.

In the tire in which the intervals a1 and a2 are small, the deformation of the core 18 is reduced. In the tire 2 having small intervals a1 and a2, the effect by the cushion layer 14 is great. In this respect, the interval a1 is preferably equal to or less than 0.8 mm, and more preferably equal to or less than 0.6 mm. The interval a2 is preferably equal to or less than 0.8 mm, and more preferably equal to or less than 0.6 mm.

Durability against deformation can be improved because a difference between the compressive elastic modulus Eα* of the crosslinked rubber of the cushion layer 14 and the compressive elastic modulus Eβ* of the crosslinked rubber of the insulation is made small. In this respect, a ratio (Eα*/Eβ*) of the compressive elastic modulus Eα* to the compressive elastic modulus Eβ* is preferably equal to or greater than 0.5, and more preferably equal to or greater than 0.7. A width, in the axial direction, of the cushion layer 14 is preferably greater than a width, in the axial direction, of the core 18.

In the tire 2 having a small compression set, even when the tire 2 is secondly mounted to a rim after removal of firstly mounting, sufficient fastening force is obtained, which compares favorably with that of the tire 2 firstly mounted to the rim. The tire 2 is excellent in re-mountability to a rim. In this respect, the compression set of the crosslinked rubber of the cushion layer 14 is preferably equal to or less than 30%. The compression set is more preferably equal to or less than 20%, and particularly preferably equal to or less than 15%.

In the present invention, the compression set is measured at 23° C. according to the standard of "JIS-K 6262". The value CS (%) of the compression set is obtained by the following formula, wherein an original thickness of a sample piece is defined as T0 (mm), a thickness of the sample piece compressed by a compressor (a spacer) is defined as T1 (mm), and a thickness of the sample piece measured 30 minutes later from taking the sample piece out of the compressor after keeping the sample piece in the compressor for a predetermined period of time.

$$CS=((T0-T2)/(T0-T1))\times 100$$

The dimensions and angles of each component of the tire are measured in a state where the tire is mounted to a normal rim and inflated to a normal internal pressure, unless otherwise specified. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

EXAMPLES

The following will show advantageous effects of the present invention by means of examples, but the present invention should not be construed in a limited manner based on the description of these examples.

[Test 1]

A pneumatic tire T1 having the structure of FIG. 1 and a conventional and commercially available tire T2 which has no cushion layer were prepared. The size of these tires was "235/50R18". The fastening forces F for these tires were measured by using a bead-expansion force tester manufactured by Hofmann Maschinen-und Anlagenbau GmbH. These tires were each mounted to a rim block of the bead-expansion force tester to measure their fastening forces F. The results are shown in FIG. 4.

Figure 4:
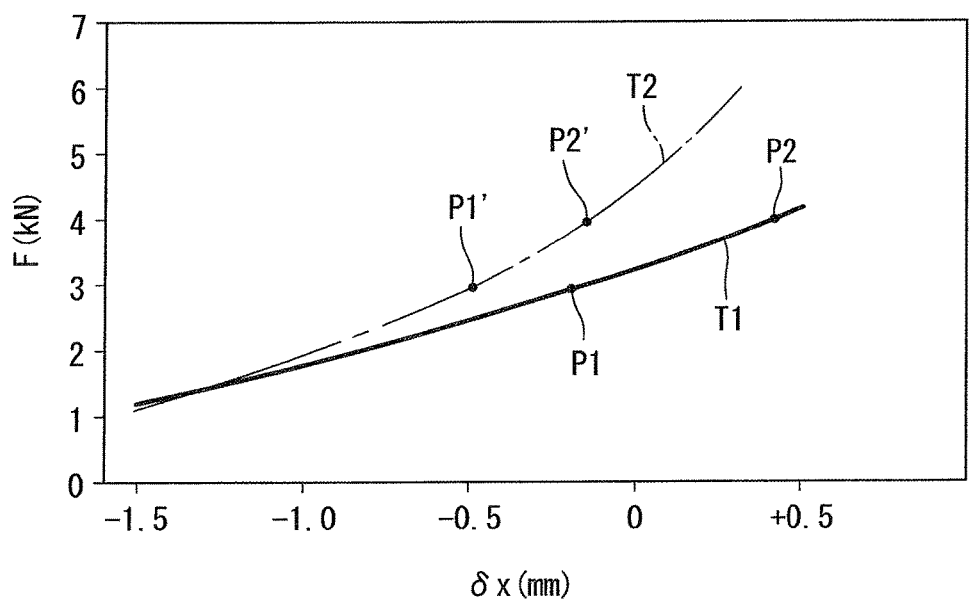
[FIG. 4]

A solid line in the graph of FIG. 4 shows a relationship between an amount δx of compressive deformation and the fastening force F in the tire T1. A one dot chain line in the graph of FIG. 4 shows a relationship between an amount δx of compressive deformation and the fastening force F in the tire T2. The amount δx of compressive deformation in the horizontal axis is calculated by the following formula, wherein an amount δo of compressive deformation for design specifications is defined as 0, and an amount δ of compressive deformation is defined as an actual amount of compressive deformation. The amount δx of compressive deformation represents an amount of difference from the amount δo of compressive deformation.

$$\delta x=\delta-\delta o$$

In the tire T1, the magnitude of change in the fastening force F with respect to the magnitude of change in the amount δx of compressive deformation is small as compared with in the tire T2. In the tire T1, the gradient of the graph is small as compared with in the tire T2. Therefore, the tire T1 has a smaller magnitude of the change in the fastening force F as compared with that of the tire T2 even when the amount δ of the compressive deformation is changed. In the tire T1, the fluctuation of the fastening force F due to variation of the diameter of the rim and/or the diameter of the core is reduced.

A point P1 in FIG. 4 shows a value of the amount δx of compressive deformation of the tire T1 when the fastening force F is 3 (kN). A point P2 shows a value of the amount δx of compressive deformation of the tire T1 when the fastening force F is 4 (kN). A point P1' shows a value of the amount δx of compressive deformation of the tire T2 when the fastening force F is 3 (kN). A point P2' shows a value of the amount δx of compressive deformation when the fastening force F is 4 (kN). The gradient of the straight line connecting the points P1 and P2 is a gradient of the change of the fastening force with respect to the change of the amount δ of compressive deformation when the fastening force F ranges from 3 (kN) to 4 (kN) in the tire T1. The gradient of the straight line connecting the points P1' and P2' is a gradient of the change of the fastening force with respect to the change of the amount δ of compressive deformation when the fastening force F ranges from 3 (kN) to 4 (kN) in the tire T2. In this example, the tire T1 has a gradient of 1.8 (kN/mm), and the tire T2 has a gradient of 2.9 (kN/mm).

[Test 2]

Example 1

A tire having the structure of FIG. 1 was prepared. The size of the tire was "235/50R18". The specifications of the tire were as shown in Table 1. A residual strain (%) shows a value of the compression set.

Comparative Example 1

A commercially available tire was prepared. The tire did not include a cushion layer. The tire was the same as Example 1, except that the specifications shown in Table 1 were changed.

Comparative Example 2

A tire was obtained in the same manner as in Comparative Example 1, except that the crosslinked rubber of the insulation was changed. In the tire, the compressive elastic modulus Eβ* of the insulation was small as compared with in the tire of Comparative Example 1.

Example 2

A tire was obtained in the same manner as in Example 1, except that the crosslinked rubber of the cushion layer was changed.

Examples 3 to 6

Tires were each obtained in the same manner as in Example 1, except that the thickness L, in the radial direction, from the chafer to the core was set as shown in Table 2 below.

Examples 7 to 10

Tires were each obtained in the same manner as in Example 1, except that the ratio (Lα/L) of the thickness Lα of the cushion layer to the thickness L of the inside, in the radial direction, of the core was set as shown in Table 3.

Examples 11 to 14

Tires were each obtained in the same manner as in Example 1, except that the compressive elastic modulus Eα* of the cushion layer and the compressive elastic modulus Eβ* of the insulation were set as shown in Table 4.

[Evaluation for Rim Mountability]

The fastening forces of each tire of Examples 1 to 14 and Comparative Examples 1 and 2 were measured by using the bead-expansion force tester manufactured by Hofmann Maschinen-und Anlagenbau GmbH. The fastening force of each tire were measured in a state where a rim diameter is set to be +0.3 mm of the normal rim and a state where a rim diameter is set to be −0.3 mm of the normal rim. The difference between the fastening forces in the states in which the rim diameter is −0.3 mm of the normal rim and the rim diameter is +0.3 mm of the normal rim was calculated. The difference of the fastening forces of the tire in Example 1 was specified as 100, and the differences of the fastening forces of other tires were indicated by indices to make evaluation. The greater the index is, the greater the change of the fastening forces is. The results are shown as change of fastening force in Tables 1 to 4.

[Evaluation for Re-Mountability to a Rim]

For the tires of Examples 1 to 14 and Comparative Examples 1 and 2, each tire was mounted to a rim having a rim diameter of the normal rim to measure its fastening force of the first time mounting by using the bead-expansion force tester manufactured by Hofmann Maschinen-und Anlagenbau GmbH. Then, each tire was removed from the rim, and was mounted again to the rim having a rim diameter of the normal rim to measure its fastening force of the second time mounting. In each tire, the fastening force of the first time mounting was specified as 100, and the fastening force of the second time mounting was indicated by index to make evaluation. The greater the index is, the greater the fastening force is. The results are shown as change of fastening force in re-mounting to a rim in Tables 1 to 4.

[Evaluation for Productivity]

For each tire of Examples 1 to 14 and Comparative Examples 1 and 2, productivity of the tire was evaluated based on adhesion of rubber members positioned inward of the core in the radial direction. The results are shown as productivity in Tables 1 to 4. Good in the evaluation shows that the productivity of equal to or greater than Comparative Example 1 can be obtained.

[Table 1]

TABLE 1

| Results of Evaluation | | Comp. Ex. 1 | Comp. Ex. 2 | Ex. 1 | Ex. 2 |
|---|---|---|---|---|---|
| thickness L (mm) | | 4 | 4 | 4 | 4 |
| ratio (Lα/L) | | — | — | 0.6 | 0.6 |
| cushion layer | $E\alpha^*$ | none | none | 1.8 | 1.8 |
| | residual strain (%) | none | none | 25 | 50 |
| insulation | $E\beta^*$ | 3.0 | 1.0 | 3.0 | 3.0 |
| ratio ($E\alpha^*/E\beta^*$) | | — | — | 0.6 | 0.6 |
| change of fastening force | | 200 | 65 | 100 | 100 |
| change of fastening force in re-mounting to a rim | | 100 | 100 | 100 | 67 |
| productivity | | good | poor | good | good |

TABLE 2

| Results of Evaluation | | Ex. 5 | Ex. 3 | Ex. 4 | Ex. 6 |
|---|---|---|---|---|---|
| thickness L (mm) | | 2 | 3 | 5 | 6 |
| ratio (Lα/L) | | 0.6 | 0.6 | 0.6 | 0.6 |
| cushion layer | $E\alpha^*$ | 1.8 | 1.8 | 1.8 | 1.8 |
| | residual strain (%) | 25 | 25 | 25 | 25 |
| insulation | $E\beta^*$ | 3.0 | 3.0 | 3.0 | 3.0 |
| ratio ($E\alpha^*/E\beta^*$) | | 0.6 | 0.6 | 0.6 | 0.6 |
| change of fastening force | | 200 | 150 | 90 | 80 |
| change of fastening force in re-mounting to a rim | | 100 | 100 | 100 | 100 |
| productivity | | good | good | good | good |

TABLE 3

| Results of Evaluation | | Ex. 9 | Ex. 7 | Ex. 8 | Ex. 10 |
|---|---|---|---|---|---|
| thickness L (mm) | | 4 | 4 | 4 | 4 |
| ratio (Lα/L) | | 0.3 | 0.5 | 0.7 | 0.9 |
| cushion layer | $E\alpha^*$ | 1.8 | 1.8 | 1.8 | 1.8 |
| | residual strain (%) | 25 | 25 | 25 | 25 |
| insulation | $E\beta^*$ | 3.0 | 3.0 | 3.0 | 3.0 |
| ratio ($E\alpha^*/E\beta^*$) | | 0.6 | 0.6 | 0.6 | 0.6 |
| change of fastening force | | 150 | 120 | 80 | 60 |
| change of fastening force in re-mounting to a rim | | 100 | 91 | 87 | 83 |
| productivity | | good | good | good | good |

TABLE 4

| Results of Evaluation | | Ex. 13 | Ex. 11 | Ex. 12 | Ex. 14 |
|---|---|---|---|---|---|
| thickness L (mm) | | 4 | 4 | 4 | 4 |
| ratio (Lα/L) | | 0.6 | 0.6 | 0.6 | 0.6 |
| cushion layer | $E\alpha^*$ | 0.9 | 1.5 | 2.1 | 2.7 |
| | residual strain (%) | 25 | 25 | 25 | 25 |
| insulation | $E\beta^*$ | 3.0 | 3.0 | 3.0 | 3.0 |
| ratio ($E\alpha^*/E\beta^*$) | | 0.3 | 0.5 | 0.7 | 0.9 |
| change of fastening force | | 60 | 80 | 120 | 150 |
| change of fastening force in re-mounting to a rim | | 100 | 100 | 100 | 100 |
| productivity | | good | good | good | good |

[Test 3]

Example 15

A tire having the same specification as Example 1 was prepared. The diameter of the bead wire of the tire was 1.2 (mm).

Examples 16 and 17

Tires were each obtained in the same manner as in Example 15, except that the diameter of the bead wire was changed as shown in Table 5.

Comparative Example 3

A tire was obtained in the same manner as in Example 15, except that the tire did not include a cushion layer and except for specifications indicated in Table 5. The diameter of the bead wire of the tire was 1.2 mm.

Comparative Examples 4 and 5

A tire was obtained in the same manner as in Comparative Example 3, except that the diameter of the bead wire was set as shown in Table 5.

[Evaluation for Rim Mountability]

For each tire of Examples 15 to 17 and Comparative Examples 3 to 5, the difference of the fastening forces was evaluated in the same manner as in the test 2. The difference of the fastening forces of the tire in Example 15 was specified as 100, and the differences of the fastening forces of respective tires were indicated by indices to make evaluation. The greater the index is, the greater the change of the fastening forces is. The results are shown as change of fastening force in Table 5.

[Evaluation for Re-Mountability to a Rim]

For tires of Examples 15 to 17 and Comparative Examples 3 to 5, each of the tires was mounted to a rim having a rim diameter of the normal rim to measure its fastening forces of the first time mounting and the second time mounting as in the test 2. In each tire, the fastening force of the first time mounting was specified as 100, and the fastening force of the second time mounting was indicated by index to make evaluation. The greater the index is, the greater the fastening force is. The results are shown as change of fastening force in re-mounting to a rim in Table 5.

TABLE 5

Table 4 Results of Evaluation

| | | Ex. 16 | Ex. 15 | Ex. 17 | Comp. Ex. 4 | Comp. Ex. 3 | Comp. Ex. 5 |
|---|---|---|---|---|---|---|---|
| thickness L (mm) | | 4 | 4 | 4 | 4 | 4 | 4 |
| ratio (Lα/L) | | 0.6 | 0.6 | 0.6 | — | — | — |
| cushion layer | Eα* | 1.8 | 1.8 | 1.8 | none | none | none |
| | residual strain (%) | 25 | 25 | 25 | none | none | none |
| insulation | Eβ* | 3.0 | 3.0 | 3.0 | 3.0 | 3.0 | 3.0 |
| ratio (Eα*/Eβ*) | | 0.6 | 0.6 | 0.6 | — | — | — |
| diameter of the bead wire (mm) | | 0.9 | 1.2 | 1.5 | 0.9 | 1.2 | 1.5 |
| change of fastening force | | 95 | 100 | 105 | 160 | 200 | 240 |
| change of fastening force in re-mounting to a rim | | 100 | 100 | 100 | 100 | 100 | 83 |

As shown in these tests, the tires of Examples have greater evaluations than those of tires of Comparative Examples. From the results of evaluations, advantages of the present invention are clear.

INDUSTRIAL APPLICABILITY

The tire explained above are widely applicable to pneumatic tires used by being mounted to a rim.

DESCRIPTION OF THE REFERENCE CHARACTERS

2 . . . tire
4 . . . clinch
6 . . . bead
8 . . . carcass
10 . . . inner liner
12 . . . insulation
14 . . . cushion layer
16 . . . chafer
18 . . . core
20 . . . apex
22 . . . carcass ply
24 . . . wire
26 . . . coating rubber
28 . . . rim

The invention claimed is:

1. A pneumatic tire comprising:
a pair of beads;
a carcass extending along and inward of a tread and sidewalls and on and between one of the beads and the other bead;
chafers positioned near the beads and abutted on a rim;
an inner liner located inward of the carcass;
an insulation interposed between the carcass and the inner liner in an axial direction; and
cushion layers, wherein
each of the beads includes a core positioned inward of the bead in a radial direction,
at an inside of the core in the radial direction, the insulation is laminated on the chafers so as to be located outward of the chafers in the radial direction,
each of the cushion layers is laminated on the insulation so as to be located outward of the insulation in the radial direction,
the insulation and the cushion layer are formed from respective crosslinked rubbers different from each other,
a compressive elastic modulus Eα* of the crosslinked rubber of the cushion layer is smaller than a compressive elastic modulus Eβ* of the crosslinked rubber of the insulation,
a lower part of the insulation extends from an inner side toward an outer side in the axial direction,
the lower part of the insulation is interposed between the cushion layer and the chafer in the radial direction, and
wherein the cushion layers are formed of a crosslinked rubber, and the cushion layers are located radially inward of the carcass ply without extending axially beyond an axial maximum width of the turn-up portion of the carcass ply.

2. The tire according to claim 1, wherein a thickness L, in the radial direction, from the chafer to the core is equal to or greater than 4 mm and equal to or less than 8 mm.

3. The tire according to claim 1, wherein, at the inside of the core in the radial direction, a ratio (Lα/L) of a thickness Lα of the cushion layer to a thickness L, in the radial direction, from the chafer to the core is equal to or greater than 0.5.

4. The tire according to claim 1, wherein a ratio (Eα*/Eβ*) of the compressive elastic modulus Eα* of the crosslinked rubber of the cushion layer to the compressive elastic modulus Eβ* of the crosslinked rubber of the insulation is equal to or greater than 0.5.

5. The tire according to claim 1, wherein, when a fastening force of the tire mounted to a rim ranges from 3 (kN) to 4 (kN), a gradient of a change of fastening forces with respect to a change of amounts of compressive deformation is equal to or greater than 1.5 (kN/mm) and equal to or less than 2 (kN/mm).

6. The tire according to claim 1, wherein,
the core is formed by winding a bead wire in a circumferential direction, and
the bead wire is wound so as to be stacked in both the radial direction and an axial direction.

7. The tire according to claim 1, wherein a compression set of the crosslinked rubber of the cushion layer is equal to or less than 30%.

8. The tire according to claim 2, wherein, at the inside of the core in the radial direction, a ratio (Lα/L) of a thickness Lα of the cushion layer to a thickness L, in the radial direction, from the chafer to the core is equal to or greater than 0.5.

9. The tire according to claim 2, wherein a ratio (Eα*/Eβ*) of the compressive elastic modulus Eα* of the crosslinked rubber of the cushion layer to the compressive elastic modulus Eβ* of the crosslinked rubber of the insulation is equal to or greater than 0.5.

10. The tire according to claim 2, wherein, when a fastening force of the tire mounted to a rim ranges from 3 (kN) to 4 (kN), a gradient of a change of fastening forces with respect to a change of amounts of compressive deformation is equal to or greater than 1.5 (kN/mm) and equal to or less than 2 (kN/mm).

11. The tire according to claim 2, wherein,
the core is formed by winding a bead wire in a circumferential direction, and
the bead wire is wound so as to be stacked in both the radial direction and an axial direction.

12. The tire according to claim 2, wherein a compression set of the crosslinked rubber of the cushion layer is equal to or less than 30%.

13. The tire according to claim 1, wherein the inner liner has a portion interposed between the insulation and the chafers.

14. The tire according to claim 1, wherein the lower part of the insulation has a distal end directly joining to the chafers, and interposed between the cushion layer and the chafer in the radial direction.

15. The tire according to claim 2, wherein the thickness L is from the bottom of the core to a point where the clinch intersects with the chafer.

16. The tire according to claim 15, wherein, at the inside of the core in the radial direction, a ratio (Lα/L) of a thickness Lα of the cushion layer to a thickness L, in the radial direction, from the chafer to the core is equal to or greater than 0.5.

17. The tire according to claim 15, wherein a ratio (Eα*/Eβ*) of the compressive elastic modulus Eα* of the crosslinked rubber of the cushion layer to the compressive elastic modulus Eβ* of the crosslinked rubber of the insulation is equal to or greater than 0.5.

18. The tire according to claim 15, wherein, when a fastening force of the tire mounted to a rim ranges from 3 (kN) to 4 (kN), a gradient of a change of fastening forces with respect to a change of amounts of compressive deformation is equal to or greater than 1.5 (kN/mm) and equal to or less than 2 (kN/mm).

19. The tire according to claim 15, wherein,
the core is formed by winding a bead wire in a circumferential direction, and
the bead wire is wound so as to be stacked in both the radial direction and an axial direction.

* * * * *